(12) United States Patent
Sharma et al.

(10) Patent No.: US 11,651,366 B2
(45) Date of Patent: May 16, 2023

(54) SYSTEMS AND METHODS FOR CREATING AND DISTRIBUTING BLOCKCHAIN-BACKED REDISTRIBUTABLE ELECTRONIC CONTENT COMPONENTS

(71) Applicant: PayPal, Inc., San Jose, CA (US)

(72) Inventors: Sahil Sharma, Bangalore (IN); Ben William Gordon Hurst, London (GB); Ping An, Punggol (SG); Purna Aditya Kumar Bhimaraju, San Jose, CA (US); Varun Kumar, Uxbridge (GB)

(73) Assignee: PAYPAL, INC., San Jose, CA (US)

( * ) Notice: Subject to any disclaimer, the term of this patent is extended or adjusted under 35 U.S.C. 154(b) by 249 days.

(21) Appl. No.: 17/012,956

(22) Filed: Sep. 4, 2020

(65) Prior Publication Data

US 2022/0076249 A1     Mar. 10, 2022

(51) Int. Cl.
*G06Q 20/00* (2012.01)
*G06Q 20/38* (2012.01)
(Continued)

(52) U.S. Cl.
CPC ....... *G06Q 20/389* (2013.01); *G06F 16/2365* (2019.01); *G06F 16/2379* (2019.01); *G06F 21/6218* (2013.01); *G06Q 20/405* (2013.01)

(58) Field of Classification Search
CPC .............. G06Q 20/405; G06Q 20/389; G06F 21/6218; G06F 16/2365; G06F 16/2379
See application file for complete search history.

(56) References Cited

U.S. PATENT DOCUMENTS

| 10,565,353 B2* | 2/2020 | Tardelli | G06N 20/00 |
| 2018/0314809 A1 | 11/2018 | Mintz et al. | |
| 2020/0090156 A1* | 3/2020 | Cella | G06N 3/02 |

FOREIGN PATENT DOCUMENTS

CN     111079092 A   *   4/2020

OTHER PUBLICATIONS

International Search Report and Written Opinion dated Nov. 23, 2021 from International Application No. PCT/US2021/047394, 10 pages.

* cited by examiner

*Primary Examiner* — Scott S Trotter
(74) *Attorney, Agent, or Firm* — Haynes and Boone, LLP

(57) ABSTRACT

Methods and systems are presented for creating and distributing blockchain-backed redistributable electronic content components. These techniques provider greater computer security and authentication controls, in various embodiments. An electronic content component associated with a first entity and a first set of actions is created. The electronic content component is published, and the first set of actions and a block representing the electronic content component are added to a blockchain. A second entity requests use of the electronic content component and a distribution agreement between the first and second entities associated with a second set of actions is created. The second set of actions and a block representing the distribution agreement are added to a blockchain. The electronic content component and distribution agreement are validated based on the blockchain, and custom content including the electronic content component is published. When an end-user accesses the electronic content component, the first and second sets of actions are executed.

20 Claims, 8 Drawing Sheets

(51) Int. Cl.
*G06F 16/23* (2019.01)
*G06F 21/62* (2013.01)
*G06Q 20/40* (2012.01)

SYSTEMS AND METHODS FOR CREATING AND DISTRIBUTING BLOCKCHAIN-BACKED REDISTRIBUTABLE ELECTRONIC CONTENT COMPONENTS

BACKGROUND

The present specification generally relates to blockchain technology, and more particularly to the publication and distribution of blockchain-backed redistributable electronic content components, according to various embodiments.

RELATED ART

Digital content may be created by an entity and distributed online to other entities that may be allowed to further distribute the content with optional, authorized modifications. Downstream entities, however, may not be able to detect whether the digital content been tampered with, and may not know whether the content conforms to the requirements and specifications of the entity that created the content. Existing channels of distributing such content, for example, e-mail, may present problems related to content authenticity and unauthorized tampering. Systems and methods are described below to mitigate and/or eliminate these problems.

Figure 1:
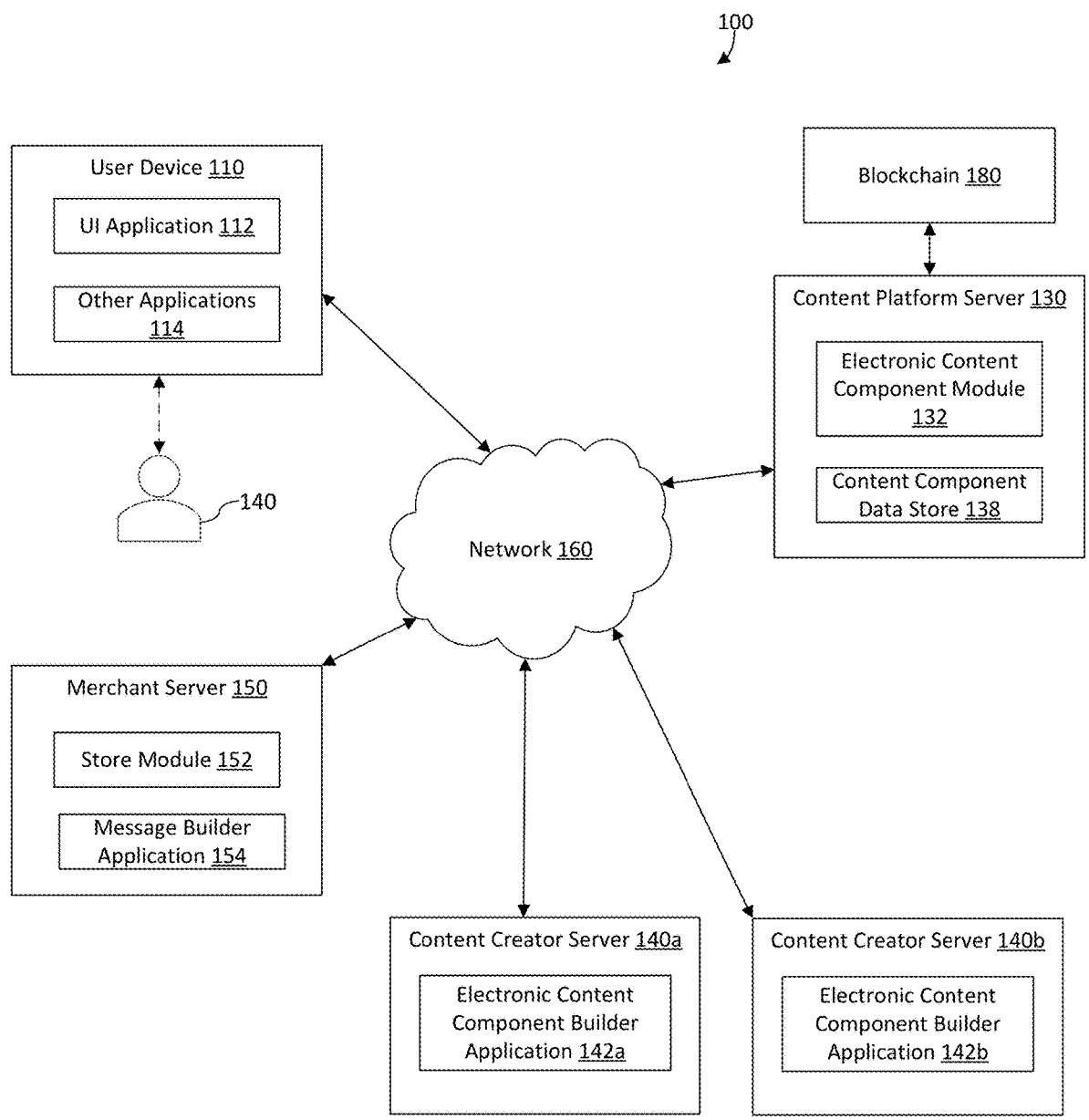
FIG. 1 is a block diagram illustrating an online system for creating and distributing redistributable electronic content components and executing actions associated with the components according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for creating and distributing redistributable electronic content components and executing actions associated with those components.

Digital content may be distributed by an entity through an electronic content component. A system may create a first electronic content component associated with a first entity (e.g., a service provider) in a database. The first electronic content component may include a first set of one or more traits, and each trait may be mutable or immutable by consumers (e.g., downstream entities) of the first electronic content component. The electronic content component may also be associated with a first set of one or more actions. Each action may be defined by code that may be executed automatically when conditions associated with the offer component and various distribution agreements are met. For example, each action may be implemented via a smart contract stored in a blockchain. One or more of the traits may be associated with the actions (e.g., a trait may be a parameter considered by an action).

The system (e.g., at the request of the service provider) may publish the first electronic content component for use or distribution by other entities. When publishing the first electronic content component, the system may store each action of the first set of actions in the blockchain (e.g., as transactions or in a ledger) and add a first electronic content component block based on the first electronic content component to the blockchain. The first electronic content component block may include a first content hash based at least on each immutable trait of the first set of traits. The system may combine the immutable traits to generate the first content hash based on the combined traits using a hashing function (e.g., secure hashing algorithm 256 (SHA-256)). The first electronic content component block may also store an address associated with each action of the first set of actions (e.g., the address of the action on the blockchain). The first content hash and the addresses of the first set of actions may also be stored as part of the electronic content component in the database.

If the system receives a request to use the first electronic content component from a second entity, the system may create a distribution agreement in the database. The distribution agreement may associate the second entity with the first electronic content component and may also be associated with a second set of one or more actions. To create the distribution agreement, the system may create a child electronic content component that is initially a clone of the first electronic content component, with a parent field of the child electronic content component storing a reference to the first (i.e., the parent) electronic content component. The child electronic content component may include a child set of one or more traits, each being a copy of a trait from the first set of traits. The system may finalize (e.g., set as immutable) each trait of the child set of traits that is associated with a finalization scope indicating the trait is to be finalized when the distribution agreement is created. The system may then add each action of the second set of actions to the blockchain (e.g., as a transaction or in a ledger) and add a distribution agreement block based on the distribution agreement to the blockchain. The distribution agreement block may include a second content hash based at least on each immutable trait of the child set of traits, and each address corresponding to an action of the second set of actions (e.g., the address of the action on the blockchain). The second content hash and the addresses of the second set of actions may also be stored as part of the distribution agreement in the database.

The request to use the first electronic content component may include a request to modify a trait of the first set of traits (e.g., the amount of a credit to be issued to an end-user that fulfills the terms an offer included in the first electronic content component). The system may determine the trait is mutable (e.g., by retrieving the first offer component from the database and checking whether it is marked mutable or immutable) and approve the request to modify the trait and to use the first electronic content component. In some embodiments, a trait may be associated with a range within which the trait may be modified. Before approving a request to modify the trait (and the request to use the first content component), the system may determine whether the modified value of the trait is within the appropriate range and approve the request only if the modified value is within the range.

For example, an online service provider may wish to incentivize a user to perform an action. The online service provider may offer the user (e.g., via e-mail) a discount to purchase a product or service, or offer to apply a credit to the user's account if the user purchases the product or service. The online service provider, however, may have greater success convincing the user to make a purchase by involving one or more entities in a distribution chain rather than contacting a user directly. For example, a local online merchant may be better known or trusted in a region than the online service provider. The online service provider may be able to increase usage of its services by having the local merchant offer the provider's products or services to local customers in exchange for an incentive (e.g., a commission). The online service provider may also wish to work with various manufacturers or resellers to reach an end-user. For example, a service provider offering online payment services may work with a consumer electronics company and a national retailer to offer a discount to a user for purchasing a product created by the consumer electronics company at a web site owned by the national retailer. The service provider may have agreements with each party in a distribution chain—with the local merchant in the first example, and with the consumer electronics company and the national retailer in the second example—with terms indicating what percentage or amount of a sale each will receive, the duration of the agreement, and which entities will bear what portion of any discount or credit given to the buyer. Once a transaction with an end-user occurs that satisfies the terms of such an agreement, the parties to the agreement may allocate the proceeds of the transaction according to the agreement and exchange funds, and/or apply a credit or future discount for the user. The overhead in creating such agreements may be large, in terms of search costs for finding willing parties, legal and other fees for creating and negotiating the agreements, and execution costs related to properly allocating funds based on the agreements following a transaction with a user. Thus, there is a need for methods allowing a service provider to communicate terms and enter into agreements with entities (that may be unknown to the service provider) in a distribution chain, that reduces the costs of discovering the entities and executing terms of the agreements.

The online service provider may establish an affiliate program, allowing other entities to promote the service provider's products and services in exchange for compensation, but such programs do not generally support a distribution chain with multiple downstream resellers, nor do they allow for multiple service providers or resellers to jointly provide incentives to customers. Furthermore, program affiliates may tamper with the terms of an offer before presenting them to a user. For example, a service provider may allow affiliates to offer a 5% discount on a product and compensate affiliates on a pay-per-click basis. An affiliate may instead promote the 5% discount as a 10% discount to entice users click on the offer. The user may click on the offer to discover the service provider offers only a 5% discount, angering the user, who may not discern that the affiliate and not the service provider was responsible for the misleading offer. The service provider may then have to pay the affiliate based on the user's click, unless it discovers the fraudulent modification to the offer by the affiliate. Policing its network of affiliates to prevent fraud adds additional costs to the service provider's attempts to obtain customers.

Accordingly, embodiments of the present invention provide methods and systems for creating and distributing redistributable electronic content components and executing actions associated with the components in a secure, tamper-resistant way. The electronic content components may include offers providing incentives to users and any entity distributing the offer. The electronic content components may be distributed and redistributed by entities in a distribution chain and combined with other electronic content components from different entities (e.g., in a message from an online merchant to its customers) while ensuring fixed terms of the offer are not changed by any entity in the distribution chain.

For example, a service provider may create an electronic content component that offers a user 5% cash back for using a payment method provided by the service provider and offers a merchant a 1% commission for distributing the electronic content component to a user who redeems the offer. An online merchant may elect to incorporate the electronic content component (e.g., using an application for composing messages that includes electronic content components) in a message intended for its customer list. The system may automatically create a distribution agreement between the online merchant and the service provider giving the merchant a 1% commission of purchases made by customers who redeem the offer using the electronic content component included in message. When the user redeems the offer, actions associated with the electronic content component and the distribution agreement are executed, crediting the user's account with the 5% cashback indicated by the offer, and the crediting the merchant with the 1% commission indicated by the distribution agreement.

Any number of entities permitted by the service provider may participate in the distribution chain between the service provider and the end-user. For example, a manufacturer of consumer electronics may elect to use the electronic content component and automatically enter into a distribution agreement with the service provider for a 1% commission. The manufacturer may itself offer the user an additional 3% cashback for purchases of its products using the service provider's payment method. The manufacturer may then publish its own electronic content component based on the one created by the service provider, offering 8% cashback. The online merchant, as before, can elect to use electronic content component in a message to its customer list, and automatically enter into a distribution agreement, this time with the manufacturer. When a customer redeems the offer indicated by the electronic content component, actions associated with both the electronic offer components and the distribution agreements and will be executed, crediting the customer with 5% from the service provider and 3% from the manufacturer, and paying the merchant the 1% commission from the sale. The system may record aspects of the electronic content components and distribution agreements in a blockchain to protect against modification of the terms of the electronic content component and distribution agreements, as described in detail below.

In some embodiments, a system may create a first electronic content component associated with a first entity (e.g., a service provider) in a database. The first electronic content component may include a first set of one or more traits, which may correspond, for example, to properties associated with an offer to an end-user. For example, the traits may include a type of incentive being made to the user (e.g., an immediate discount, a discount or voucher for future use, a cashback offer or statement credit, etc.), an amount associated with the incentive (e.g., the amount of a discount or credit), and dates for which the offer is valid. Each trait may be mutable or immutable by consumers (e.g., merchants or resellers) of the first electronic content component. The mutability of a trait may be defined by a finalization scope associated with the trait. For example, the finalization scope may indicate that the trait is to be made immutable when a distribution agreement is created, or when custom content including the electronic content component is published. A trait may also be marked as immutable when the electronic content component is first created.

The first electronic content component may also be associated with a first set of one or more actions (e.g., crediting the user's account with money or another type of credit, applying a discount to a purchase, adding a voucher for a discount on a future purchase to the user's account, performing operations to provide any incentives indicated by a trait, etc.). Each action may be defined by code that may be executed automatically when conditions associated with the offer component and various distribution agreements are met. For example, each action may be implemented via a smart contract stored in a blockchain. In some embodiments, actions and/or traits may also be associated with a penalty. For example, if the user earns a credit for purchasing a product and later returns the product, an action removing the credit from the user's account may be executed.

The system (e.g., at the request of the service provider) may publish the first electronic content component for use or distribution by other entities. When publishing the first electronic content component, the system may store each action of the first set of actions in the blockchain (e.g., as transactions or in a ledger) and add a first electronic content component block based on the first electronic content component to the blockchain. The first electronic content component block may include a first content hash based at least on each immutable trait of the first set of traits. For example, the first electronic content component may include as immutable traits a name, a maximum cashback value, a minimum cashback value, and an expiration date. The system may combine the immutable traits to generate the first content hash based on the combined traits using a hashing function (e.g., SHA-256). The first electronic content component block may also store an address associated with each action of the first set of actions (e.g., the address of the action on the blockchain). The first content hash and the addresses of the first set of actions may also be stored as part of the electronic content component in the database.

The system may receive a request to use the first electronic content component from a second entity (e.g., a reseller or merchant). In response to the request, the system may create a distribution agreement in the database. The distribution agreement may associate the second entity with the first electronic content component and may also be associated with a second set of one or more actions (e.g., paying a commission to the second entity, or deducting a previously paid commission from the second entity's account). To create the distribution agreement, the system may create a child electronic content component that is initially a clone of the first electronic content component, with a parent field of the child electronic content component storing a reference to the first (i.e., the parent) electronic content component. The child electronic content component may include a child set of one or more traits, each being a copy of a trait from the first set of traits. The system may finalize (e.g., set as immutable) each trait of the child set of traits that is associated with a finalization scope indicating the trait is to be finalized when the distribution agreement is created. The system may then add each action of the second set of actions to the blockchain (e.g., as a transaction or in a ledger) and add a distribution agreement block based on the distribution agreement to the blockchain. The distribution agreement block may include a second content hash based at least on each immutable trait of the child set of traits, and each address corresponding to an action of the second set of actions (e.g., the address of the action on the blockchain). The second content hash and the addresses of the second set of actions may also be stored as part of the distribution agreement in the database.

In some embodiments, the request to use the first electronic content component may include a request to modify a trait of the first set of traits (e.g., the amount of a credit to be issued to an end-user that fulfills the terms an offer included in the first electronic content component). The system may determine the trait is mutable (e.g., by retrieving the first offer component from the database and checking whether it is marked mutable or immutable) and approve the request to modify the trait and to use the first electronic content component. In some embodiments, a trait may be associated with a range within which the trait may be modified. Before approving a request to modify the trait (and the request to use the first content component), the system may determine whether the modified value of the trait is within the appropriate range and approve the request only if the modified value is within the range.

The system may then receive a request from the second entity to publish custom content including the first electronic content component (which may be represented internally by the cloned or child electronic content component). The custom content may be, for example, an e-mail message from the second entity to customers that incorporates the first electronic offer component. The system may validate the first electronic content component with respect to the request to publish the custom content. For example, the system may determine, based on the first content hash and the second content hash, that no immutable traits of the first set of traits or the second set of traits has been modified in the custom content. The system may retrieve the second content hash from the database and compare it with the second content hash stored in the distribution agreement block in the blockchain to ensure they match, and similarly compare the first content hash from the database with the first content hash stored in the first electronic content component block in the blockchain to ensure they match. If the content hashes match (indicating that no immutable traits have been modified), the system may approve the request to publish the custom content. Otherwise, if the content hashes do not match, the system may reject the request. After approving the request to publish the custom content, the system may decorate a URL associated with the first content component (and any other content components to be included in the custom content) with tracking information. For example, the tracking information may allow the system to determine an end-user has followed the link indicated by the URL.

When the end-user accesses the first electronic content component (e.g., by following the link included in the custom content and/or by making a purchase based on the link), the system may receive a notification that the user has accessed the first electronic content component. In response to the notification, the system may execute the second set of actions and the first set of actions. For example, the system may pay any commission owed to the second entity based on the terms of the distribution agreement (using funds from the first entity), and apply any credit or discount owed to the end-user based on the first electronic content component.

In some embodiments, the distribution agreement may be associated with a time frame indicating when the distribution agreement is valid. The system may receive a second notification that a second end-user has accessed the first electronic content component at an access time outside the valid time frame and determine not to execute the second set of actions or the first set of actions in response to the access time being outside the valid time frame.

In some embodiments, the second entity may request to publish its own electronic content component rather than incorporate the first electronic content component directly into custom content (e.g., an e-mail message). For example, the second entity may be a reseller intending to make the electronic content component available to merchants with better access to certain customers. The second entity may wish to create a new electronic content component based on the first content component, where the new content component splits the commission of the first content component between itself and a third entity. As another example, the second entity may wish to add incentives for the end-user for purchasing a particular product (e.g., if the second entity is a shoe manufacturer, it may wish to offer a discount on its brand of shoes in addition to the cashback included in the first electronic content component). The second entity may then wish to publish an electronic content component that includes its own incentives as well as those offered by the first entity. In these and other cases, the system may receive a request from the second entity to publish a second electronic content component based on the first electronic content component and approve the request (e.g., after determining no immutable traits of the first electronic content component have been modified). As with the first electronic content component, the system may create a second electronic content component in the database associated with a second set of traits and a third set of actions (e.g., additional incentives for the end-user), and add a second electronic content component block and the third set of actions to the blockchain. The system may then receive a request from a third entity to use the second electronic content component.

As when receiving the request to use the first electronic content component, the system may create a second distribution agreement associating the third entity with the second electronic content component in the database. The second distribution agreement may be associated with a fourth set of actions (e.g., incentives for the third entity paid for by the second entity). Following the same procedure described above for the first distribution agreement, the system may add a second distribution agreement block to the blockchain based on the second distribution agreement, and add the fourth set of actions to the blockchain (e.g., as transactions or in a ledger). The system may then receive a request to publish custom content including the second electronic content component. After validating that no immutable traits of the first or second electronic content components were modified, the system may approve the request to publish the custom content (or if any traits were modified, the system may reject the request). The system may also validate whether the first or second distribution agreements were modified and terminate any downstream distribution agreements as a result. For example, the system may determine the first distribution agreement was modified (based on a mismatch between the content hash stored in the database and the content hash stored in the blockchain), reject the request to publish the custom content, and terminate the second distribution agreement.

If the system approves the request to publish the custom content, the system may receive a notification that an end-user has accessed the second electronic content component and in response to the notification, execute the fourth, third, second, and first set actions (e.g., paying any commission due to the entities and applying any credits and/or discounts due to the end-user).

FIG. 1 illustrates an online system 100 for creating and distributing redistributable electronic content components and executing actions associated with the components according to an embodiment of the present disclosure. The online system 100 as shown includes a content platform server 130, a blockchain 180, one or more content creator servers (e.g., 140a and 140b), a merchant device 150, and a user device 110, each of which may communicate with other components via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 150 over the network 160. For example, the user 140 may use the user device 110 to find and purchase goods and/or services from the merchant server 150.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the merchant server 150 over the network 160. In one implementation, the user interface application 112 includes a software program, such as a graphical user interface (GUI), executable by a processor that is configured to interface and communicate with the merchant server 150 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 114 as may be desired in one or more embodiments of the present disclosure to provide additional features available to the user 140. For example, the applications 114 may include security applications for implementing client-side security features, programmatic client applications for interfacing with appropriate application programming interfaces (APIs) over the network 160, and/or various other types of generally known programs and/or software applications. In still other examples, the other applications 114 may interface with the user interface application 112 for improved efficiency and convenience.

In various implementations, the user 140 can input data and information into an input component (e.g., a keyboard) of the user device 110 to provide user information with a request, such as a request to purchase goods or servers, log in to an account, or other types of request. The user information may include user identification information.

Even though only one user device 110 is shown in FIG. 1, it has been contemplated that one or more user devices (each similar to user device 110) may communicate with other components via the network 160 within the system 100.

The content platform server 130, in one embodiment, includes an electronic content component module 132 and a component data store 138. The electronic content component module 132 may support the creation, publication, and distribution of electronic content components. For example, the electronic content component 132 may receive requests from content creator servers 140a and 140b to create, publish, and distribute electronic content components, and from merchant server 150 to build messages that include electronic content components. The electronic content component module 132 may also create distribution agreements when a request is received from a content creator server 140a to use an electronic content component created from a different content creator server 140b. The electronic content component module 132 may store the electronic content components and distribution agreements (e.g., records representing the electronic content component and distribution agreements) in the content component data store 138. The electronic content component module 132 may also create a block in the blockchain 180 for each electronic content component and distribution agreement, including a hash based on immutable traits or properties of the electronic content component or distribution agreement. A copy of each hash may be stored with the corresponding electronic content component or distribution agreement in the content component data store 138, for use in determining whether an electronic content component or distribution agreement has been tampered with (e.g., by comparing a hash in the content component data store 138 with its corresponding hash in the blockchain). The electronic content component module 132 may also store actions (e.g., as smart contracts) associated with each electronic content component and distribution agreement in the blockchain 180 (e.g., as transactions or in a ledger) and trigger those actions in response to a user 140 interacting with the electronic content component (e.g., clicking on a link within the electronic content component in an e-mail message or making a purchase on the merchant server 150).

The merchant server 150, in one embodiment, includes a store module 152 and a message builder application 154. The store module 152 may include various applications and components for running an online store including a storefront allowing users to view and purchase goods and services, a backend including a web server for hosting the storefront and managing inventory, and storage for storing product information and user account information. The message builder application 154 provides functionality for composing messages (e.g., e-mail messages) that include electronic content components. For example, an agent (e.g., an employee of the merchant operating the merchant server 150) may compose a message to be sent to customers of the merchant that includes content created by the agent and one or more electronic content components. The message builder application 154 may be a standalone application executed on the merchant server 150, or a web browser that accesses a message builder hosted by the content platform server 130. Even though only one merchant server 150 is shown in FIG. 1, it has been contemplated that one or more merchant servers 150 may communicate with other components via the network 160 within the system 100.

Each content creator server 140 may include an electronic content component builder application 142, which may be the same as or similar to the message builder application 154 on the merchant server 150, with additional functionality for creating electronic content components. The electronic content component builder application 142 may present an interface for creating, modifying, and distributing electronic content components. The electronic content component builder application 142 may allow a content creator to define the parameters of an electronic content component, including incentives for an end-user satisfying various conditions, and incentives for any entity distributing the electronic content component. For example, content creator server 140a may, using electronic content component builder application 142a, create and publish an electronic content component giving a user a 5% discount on any purchase made with a payment method managed by the content creator. The electronic content component may stipulate that an entity (e.g., a merchant or reseller) who distributes the electronic content component will receive a 1% commission on sales resulting from the electronic content component. Content creator server 140b, using electronic content component builder application 142b, may access the electronic content component and create a new electronic content component based on the one created by content creator server 140a, offering a 0.5% commission (e.g., taken from the 1% commission) to merchants who complete sales based on the new electronic content component, and distribute the new electronic content component to a number of merchant servers, including merchant server 150 (which may not have been visible to content creator server 140a).

Figure 2:
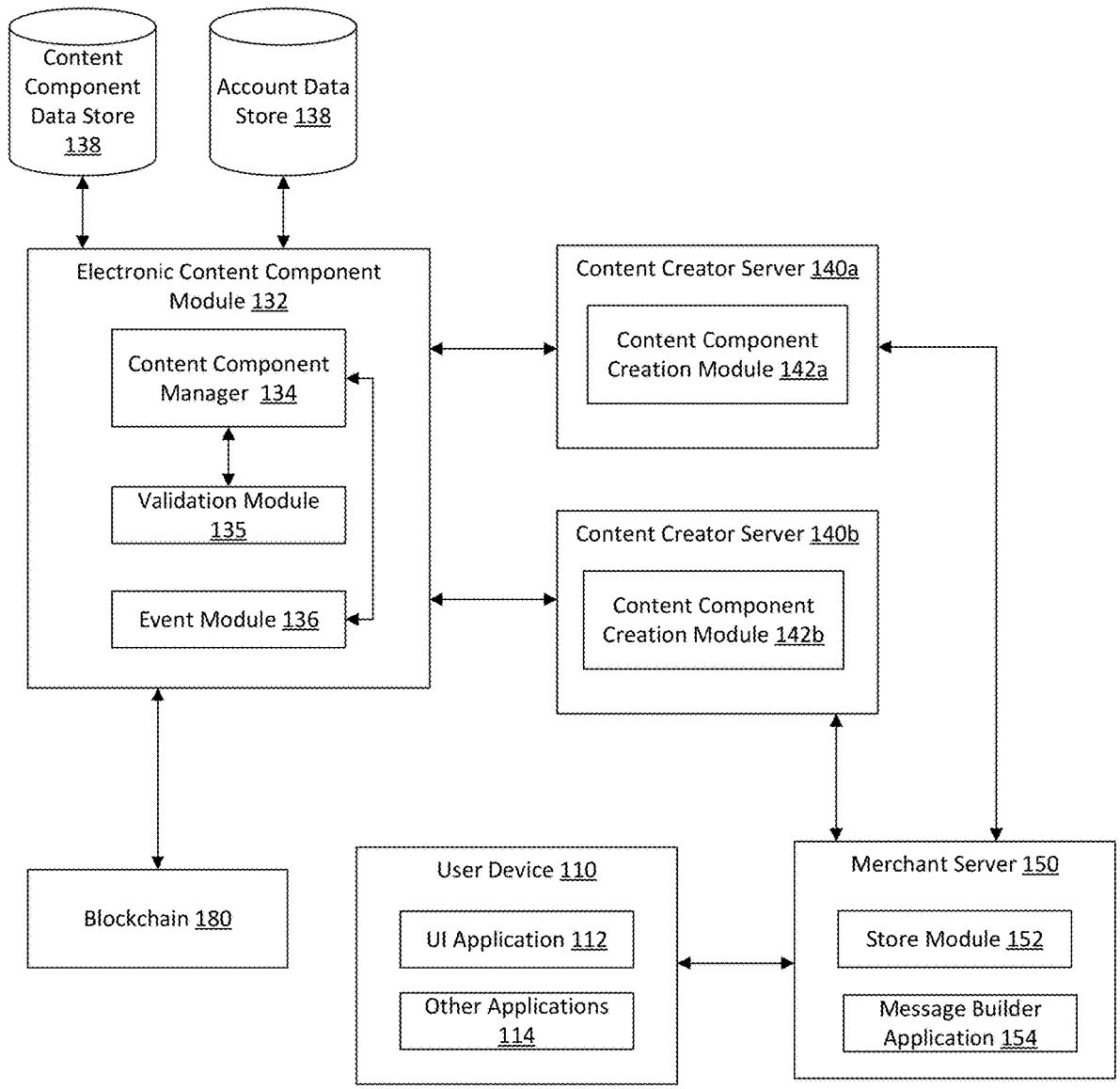
FIG. 2 is a block diagram illustrating communication among components of an online system for creating and distributing redistributable electronic content components and executing actions associated with the components according to an embodiment of the present disclosure.

FIG. 2 illustrates a block diagram, in more detail, of the system 100 interacting with the electronic content component module 130 according to an embodiment of the present disclosure. As shown, electronic content component module 132 includes a content component manager 134, a validation module 135, and an event module 136, and may communicate with a content component data store 138 to store and retrieve data related to electronic content components, an account data store 138 to store and retrieve data related to content creators (e.g., resellers, merchants, etc.), and a blockchain 180 to store data related to electronic content components and distribution agreements. The blockchain 180 may be used to ensure the integrity of the electronic content components and distribution agreements (e.g., that immutable traits of electronic content components and distribution agreements have not been modified), facilitate discovery of distribution agreements and electronic content components in the distribution chain of an electronic content component, and store actions associated with electronic content components and distribution agreements.

The content component data store 138 may store data representing electronic content components and distribution agreements. For example, for every electronic content component, the content component data store may store a record including an electronic content component ID, a parent ID (if the electronic content component is cloned or derived from another electronic content component), the name of the electronic content component, descriptions of the electronic content component for display in a message builder application 154 and content creation module 142 (including a brief summary and a detailed description), user interface (UI) elements for inclusion in custom content (e.g., e-mail messages and web pages) that include the electronic content component (e.g., HTML files, images, JavaScript code, etc.), traits (e.g., customizable attributes such as a cashback or credit amount, a discount, an expiration date, how many times the electronic content component may be redistributed, etc.), actions (e.g., smart contracts to be executed when user-related events occur such as clicking a link in the electronic content component or making a purchase), state information (e.g., whether the electronic content component is a draft or has been published, or whether the electronic content component is inactive or archived). Each record may also include a content hash of the electronic content component including properties of the electronic content component that are fixed when the electronic content component is created or published (e.g., the name, descriptions, and any immutable traits), which may also be stored in a block on the blockchain 180. The content component data store 138 may also store data representing distribution agreements, which are created when a request is received from a content creator server 140 or merchant server 150 to use an existing electronic content component. Each distribution agreement (e.g., each record representing a distribution agreement) may include a distribution agreement ID, a parent distribution agreement ID (identifying the distribution agreement preceding the current one in the distribution chain), the name of the distribution agreement, the electronic content component to which the distribution agreement pertains, the transferor (the entity which is offering the electronic content component), the transferee (the entity using the electronic content component), a flag or counter indicating whether and/or how many times the electronic content component can be further distributed by the transferee, start and end times indicating when the transferee may use the electronic content component, terms and conditions, and actions (e.g., smart contracts to be executed when user-related events occur such as clicking a link in the electronic content component or making a purchase).

The account data store 138 may store data related to which entities (e.g., manufactures, service providers, resellers, merchants, etc.) have access to content made available by the content platform server 130. For example, the account data store 138 may store authentication information (e.g., usernames and passwords) and/or certificate data to verify the identity of an entity. The offer servers 140a and 140b and the merchant server 150 may access content from the content platform server 130 using the login information and/or certificate information. The account data store 138 may also include information indicating which entities have access particular to electronic content components. For example, an entity may create groups with different entities as members, and only make an electronic content component available to entities within a particular group.

The blockchain 180 (which may be a blockchain 620 or 700 as described in FIGS. 6 and 7) may be a private permissioned blockchain and may be governed by the entity controlling the content platform server 180. In some embodiments, any number of content creator servers (e.g., 140a and 140b) may be peers in a blockchain network managing the blockchain 180, with access and permissions determined by the content platform server 180. The blockchain 180 may store linked blocks corresponding to electronic content components and distribution agreements, as well as actions associated with the electronic content components and distribution agreements. Each electronic content component block may include a unique block ID identifying the block, which may also be stored in the record corresponding to the electronic content component in the content component data store 138, an index identifying the creation order of the block, a time stamp indicating the creation time of the block, the hash of the previous block in the blockchain, and data (e.g., transaction information) including a hash of immutable traits of the electronic content component and the addresses (in the blockchain) of any actions associated with the electronic content component. Similarly, each distribution agreement block may include a unique block ID identifying the block, which may also be stored in the record corresponding to the distribution agreement in the content component data store 138, an index identifying the creation order of the block, a time stamp indicating the creation time of the block, the hash of the previous block in the blockchain, and data (e.g., transaction information) including the electronic content component ID of the electronic content component associated with the distribution agreement, a hash of immutable attributes of the distribution agreement, and the addresses (in the blockchain) of any actions associated with the distribution agreement.

The content component manager 134 may support the creation, publication, and distribution of electronic content components. For example, the content component manager 134 may receive a request from content creator server 140a (e.g., from the content component creation module 142a) to create a first electronic content component with attributes configured using the content component creation module 142a. The attributes may include, for example, a set of traits indicating an end-user will receive 5% cash back for a purchase made with a specific payment method, and a merchant sending the electronic content component to end-users will receive a 1% commission when an end-user redeems the offer indicated by the electronic content component. The content component manager 134 may create the first electronic content component (e.g., a record for the electronic content component) in the content component data store 138.

The content component manager 134 may then receive a request to publish the electronic content component from content creator server 140a. The electronic content component module 132 may update the electronic content component in the content component data store 138 to change the status from draft to published, add a block to the blockchain corresponding to the electronic content component (with the attributes described above), add any actions related to the electronic content component to the blockchain (e.g., as smart contracts stored in a transaction), and make the electronic content component available for distribution. The electronic content component module 132 may then receive a request to distribute the first electronic content component from content creator server 140b (e.g., via content component creation module 142b). The electronic content component module 132 may coordinate with the validation module 135 as described below to validate the electronic content component.

The electronic content component module 132 may then create a first distribution agreement in the content component data store and clone the first electronic content component to create a second electronic content component. The electronic content component module 132 may set the parent ID of the second electronic content component to that electronic content component ID of the first electronic content component. The content component creation module 142b may modify any mutable aspects of the electronic content component (e.g., the 10% cash back may be changed to 12% cash back with the additional condition that the purchase be for a particular brand, and the 1% commission may be changed to a 1.5% commission, with the entity making the modification bearing the cost of the additional 2% cash back and the additional 0.5% commission) and request publication of the electronic content component from the content component manager 134. The content component manager 134 may communicate with the validation module 135 to validate the second electronic content component as described below, then publish the second electronic content component in the same manner as the first electronic content component.

The content component manager 134 may receive a request from the message builder application 154 on the merchant server 150 to create custom content that includes the first electronic content component and/or the second electronic content component. For example, the message builder application 154 may compose a message offering users the option of redeeming the offer indicated by either electronic content component (10% cash back for using the indicated payment method, or 12% cash back for using the indicated payment method to purchase a product of the indicated brand). The content component manager 134 may communicate with the validation module 135 as described below to validate (e.g., verify that no immutable traits have changed) both electronic content components and allow creation of the custom content. The custom content may include an indication (e.g., a checkmark, star, ribbon, or other icon visible to the end-user) that the electronic content components have been validated. Clicking or tapping on the indicator may take the user to a web page hosted on the content platform server 130, which includes validation information for any electronic content component included in the custom content. For example, the web page may include a representation of the distribution chain, showing which entities each electronic content component originated from and the terms of each electronic content component. A second distribution agreement may be created in the content component data store (with the parent distribution agreement ID set to the distribution agreement ID of the first distribution agreement) between the content creator server 140b (e.g., the entity controlling the content creator server 140b) and the merchant server 150 (e.g., the merchant controlling the merchant server 150), and a distribution agreement block may be added to the blockchain.

After validation, the message builder application 150 may allow the custom content to be published and sent to end-users (e.g., through a function of the message builder application 150, or by exporting the custom content for transmission by a different application). During publication of the custom content, the message builder application 154 may decorate URLs associated with each electronic content component with parameters (e.g., parameters indicated by the content component manager) to allow for tracking of an end-user accessing the electronic content component (e.g., to allow the electronic content component module 132 to determine a that a link in an electronic content component was followed, identify the electronic content component, and identify the merchant).

The event module 136 may receive user event notifications from the merchant server related to an electronic content component. For example, the event module may receive a notification when a user (e.g., on the user device 100, using the UI application 112) clicks or hovers over an element in the storefront (provided by the store module 152) or makes a purchase. The store module 152 may be configured (e.g., via JavaScript code) to send event notifications related to the electronic content component to electronic content component module 132, enabling the electronic content component module 132 to determine when conditions for performing the actions associated with an electronic content component and/or distribution agreement are met. The event module 132 may receive the user event notifications, process them, and notify event listeners registered to receive the notifications in the electronic content component module 132, which may include the content component manager 134. The content component manager may receive the notifications, determine the conditions associated with the electronic content component are met, and initiate the actions associated with the electronic content component and any related distribution agreements.

For example, the event module 136 may receive a notification that the user purchased a product of the brand indicated by the second electronic content component using the payment method indicated by the second electronic content component, process the notification, and transmit it to any listeners. The content component manager 134 may receive the notification and initiate any actions associated with the second electronic content component and any distribution agreements in the distribution chain of the second electronic content component. For example, the content component manager 134 may retrieve the second distribution agreement from the content component data store using a distribution agreement ID included in the notification. The content component manager 134 may initiate execution of the actions associated with the second distribution agreement based on the addresses (e.g., smart contract addresses) stored in the distribution agreement (e.g., by sending a transaction to the blockchain with the contract addresses). For example, a smart contract may pay the merchant the 0.5% commission. The content component manager 134 may retrieve the second electronic content component (based on the electronic content component ID stored in the distribution agreement) and execute the actions associated with it (e.g., paying the 2% cashback to the end-user). The content component manager may then backtrack through the distribution chain (using the parent distribution agreement ID stored with each distribution agreement) to retrieve the first distribution agreement. The content component manager may then execute the actions associated with the first distribution agreement (paying the 1% commission) and the first electronic content component (paying the 10% cashback).

The validation module 135 may validate electronic content components at various stages of the electronic content component publication process, for example, before an electronic content component or custom content including an electronic content component is published. The validation module 135 may verify that no immutable traits of an electronic content component have been modified. For example, the validation module 135 may retrieve the hash of an electronic content component from the electronic content component in the content component data store 138 and compare it to the hash of stored in the electronic content component block in the blockchain to ensure they match. The validation module may backtrack through the distribution chain (using the parent ID of each electronic content component) to verify that no immutable traits have been modified. The validation module 135 may also verify that publication of an electronic content component or custom content including the electronic content component is within a time period indicated by the electronic content component or a distribution agreement associated with the electronic content component. The validation module 135 may also verify that an entity requesting to use an electronic content component, whether for redistribution or for publishing custom content that includes the electronic content component, has permission to use the electronic content component (e.g., either because it created the electronic content component, or because it was granted permission to use the electronic content component through a distribution agreement), and that the electronic content component has not been distributed more than an allowed number of times (e.g., the electronic content component may indicate that an electronic content component may be distributed at most two levels deep in a distribution chain). The validation module 135 may notify the content component manager 134 of any validation failures, and the content component manager 134 may reject publication and distribution of the second electronic content component or custom content that includes the second electronic content component in response to the validation failure.

Figure 3:
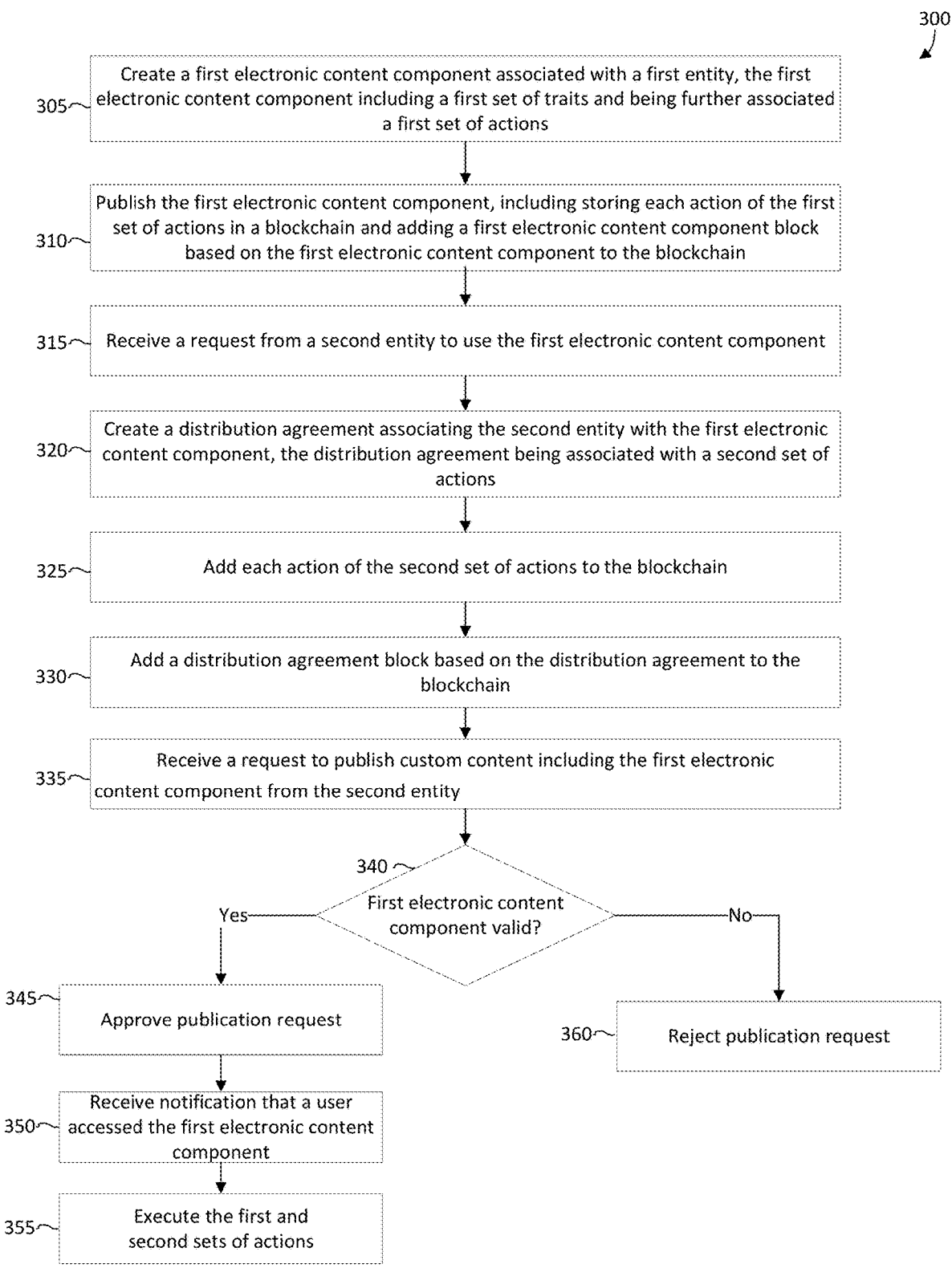
FIG. 3 illustrates a process for creating and distributing redistributable electronic content components and executing actions associated with the components according to an embodiment of the present disclosure.

FIG. 3 illustrates a process 300 for creating and distributing redistributable electronic content components and executing actions associated with the components. Note that the steps described below with respect to FIG. 3 are also described above and can be performed in a different order, combined, or omitted as appropriate in different embodiments. According to various embodiments, one or more operations described in FIG. 3 may be performed by a content platform server 130 and/or another computer system (e.g., computer system 800 illustrated in FIG. 8.).

At block 305, the process 300 (e.g., using the content component manager 134 in response to a request from a content creator server 140) may create a first electronic content component associated with a first entity (e.g., a service provider operating the content creator server 140) in a database (e.g., in the content component data store 138). The first electronic content component may include a first set of one or more traits, which may correspond, for example, to properties associated with an offer to an end-user. For example, the traits may include a type of incentive being made to the user (e.g., an immediate discount, a discount or voucher for future use, a cashback offer or statement credit, etc.), an amount associated with the incentive (e.g., the amount of a discount or credit), and dates for which the offer is valid. Each trait may be mutable or immutable by consumers (e.g., merchants or resellers) of the first electronic content component. The mutability of a trait may be defined by a finalization scope associated with the trait. For example, the finalization scope may indicate that the trait is to be made immutable when a distribution agreement is created, or when custom content including the electronic content component is published. A trait may also be marked as immutable when the electronic content component is first created. The first electronic content component may also include additional attributes including an electronic content component ID, a name, descriptions of the electronic content component, elements for inclusion in custom content that includes the electronic content component (e.g., HTML files, images, JavaScript code, etc.), and/or state information (e.g., whether the first electronic content component is a draft or has been published, or whether the first electronic content component is inactive or archived).

The first electronic content component may also be associated a first set of one or more actions (e.g., crediting the user's account with money or another type of credit, applying a discount to a purchase, adding a voucher for a discount on a future purchase to the user's account, etc.). Each action may be defined by code that may be executed automatically when conditions associated with the offer component and various distribution agreements are met. For example, each action may be implemented via a smart contract, with the address of each smart contract stored in the electronic content component.

At block 310, the process 300 (e.g., using the content component manager 134 in response to a request from a content creator server 140) may publish the first electronic content component for use or distribution by other entities. When publishing the first electronic content component, the content component manager 134 may store each action of the first set of actions in a blockchain (e.g., as transactions or in a ledger) and add a first electronic content component block based on the first electronic content component to the blockchain. The first electronic content component block may include a first content hash based at least on each immutable trait of the first set of traits. For example, the first electronic content component may include as immutable traits a maximum cashback value, a minimum cashback value, and an expiration date. The content component manager 134 may combine the immutable traits to generate the first content hash based on the combined traits using a hashing function (e.g., SHA-256). The first electronic content component block may also store an address associated with each action of the first set of actions (e.g., the address of the action on the blockchain 180). The first content hash and the addresses of the first set of actions may also be stored as part of the electronic content component in the database for use by the process 300 when validating the first electronic content component and executing the first set of actions.

At block 305, the process 300 (e.g., via the content component manager 134) may receive a request to use the first electronic content component from a second entity (e.g., from a reseller via a content creator server 140b or a merchant via a merchant server 150). For example, a merchant operating the merchant server 150 may wish to compose custom content including the first electronic content component using the message builder application 154.

At step 320, in response to the request to use the first electronic content component, the process 300 (e.g., using the content component manager 134) may create a distribution agreement in the database (e.g., in the content component data store 138). The distribution agreement may associate the second entity with the first electronic content component and may also be associated with a second set of one or more actions (e.g., paying a commission to the second entity). For example, the content component manager 134 may set a transferor field of the distribution agreement to the entity operating the content creator server 140a, and a transferee field to the entity operating the merchant server 150. To create the distribution agreement, the system may create a child electronic content component that is initially a clone of the first electronic content component, with a parent field of the child electronic content component storing a reference to the first electronic content component. The child electronic content component may include a child set of one or more traits, each being a copy of a trait from the first set of traits. The content component manager 134 may finalize (e.g., set as immutable) each trait of the child set of traits that is associated with a finalization scope indicating the trait is to be finalized when the distribution agreement is created.

At block 325, the process 300 (e.g., using the content component manager 134) may add each action of the second set of one or more actions to the blockchain (e.g., as transactions or in a ledger), and at block 330, the process 300 may add a distribution agreement block based on the distribution agreement to the blockchain. The distribution agreement block may include a second content hash based at least on each immutable trait of the child set of traits, and each address corresponding to an action of the second set of actions (e.g., the address of the action on the blockchain 180). The second content hash and the addresses of the second set of actions may also be stored as part of the distribution agreement in the database.

In some embodiments, the request to use the first electronic content component may include a request to modify a trait of the first set of traits (e.g., the amount of a credit to be issued to an end-user). The process 300 (e.g., using the validation module 135) may determine the trait is mutable (e.g., by retrieving the first electronic content component from the database and checking whether the trait is marked mutable or immutable) and approve the request to modify the trait and to use the first electronic content component. In some embodiments, a trait may be associated with a range within which the trait may be modified. Before approving a request to modify the trait (and the request to use the first content component), the validation module 135 may determine whether the modified value of the trait is within the appropriate range and approve the request only if the modified value is within the range.

At block 335, the process 300 (e.g., via the content component manager 132) may receive a request from the second entity (e.g., a merchant via the merchant server 150) to publish custom content including the first electronic content component (which may be represented internally by the cloned or child electronic content component). The custom content may be, for example, an e-mail message from the second entity to customers that incorporates the first electronic offer component or a web page that incorporates the first electronic offer component.

At block 340, the validation module 135 may validate the first electronic content component with respect to the request to publish the custom content. For example, the validation module 135 may determine, based on the first content hash and the second content hash, that no immutable traits of the first set of traits or the second set of traits has been modified. The validation module 135 may retrieve the second content hash from the component data store 138 and compare it with the second content hash stored in the distribution agreement block in the blockchain to ensure they match, and similarly compare the first content hash from the component data store 138 with the first content hash stored in the first electronic content component block in the blockchain to ensure they match. If the content hashes match (indicating, e.g., that no immutable traits have been modified), process 300 proceeds to block 345 where the content component manager 134 may approve the request to publish the custom content. Otherwise, if the content hashes do not match, the process 300 proceeds to 360 where the content component manager 134 may reject the request.

At block 345, the process 300 (using the content component manager 134) may approve the request to publish the custom content. The content component manager 134 may decorate a URL associated with the first content component (and any other content components to be included in the custom content) with tracking information. For example, the URL may be decorated with the query string including the ID of the first electronic content component and the distribution agreement (e.g., "?eccID=827AJn0445k&daID=100354619& . . . ") from which the content component manager 134 may determine that the first electronic content component that was clicked. The tracking information may allow the content component manager 134 to determine an end-user has followed the link indicated by the URL (e.g., by first directing the user to the content platform server 130 before redirecting the user to merchant server 150, or by having the merchant server 150 report the tracking information to the electronic content component module 132).

At block 350, the process 300 (e.g., via the event module 136) may receive a notification that the user has accessed the first electronic content component. For example, the user may have followed the link included in within the first electronic content component in the custom content and/or made a purchase after following the link. In response to the notification, the content component manager 134 may execute the second set of actions and the first set of actions. The content component manager 134 may retrieve the distribution agreement from the content component data store 138 using a distribution agreement ID included in the notification. The content component manager 134 may initiate execution of the actions associated with the distribution agreement based on the addresses (e.g., smart contract addresses) stored in the distribution agreement (e.g., by sending a transaction to the blockchain with the contract addresses). The content component manager 134 may then retrieve the first electronic content component using the electronic content component ID stored in the distribution agreement and execute any actions associated with the first electronic content component (using the addresses stored within the second electronic content component). For example, the actions associated with the distribution agreement may pay any commission owed to the second entity based on the terms of the distribution agreement (using funds from the first entity), and the actions associated with the first electronic content component may apply a credit or discount owed to the end-user.

In some embodiments, the distribution agreement may be associated with a time frame indicating when the distribution agreement is valid. The event module 136 may receive a second notification that a second end-user has accessed the first electronic content, and the validation module 135 may determine the first component was accessed at an access time outside the valid time frame. The content component manager 134 may then determine not to execute the second set of actions or the first set actions.

In some embodiments, the second entity may request to publish its own electronic content component rather than incorporate the first electronic content component directly into custom content (e.g., an e-mail message). For example, the second entity may be a reseller intending to make an electronic content component available to merchants with better access to certain customers. The second entity may wish to create a new electronic content component based on the first content component, where the new content component splits the commission of the first content component between itself and a third entity. As another example, the second entity may wish to add incentives for the end-user for purchasing a particular product (e.g., if the second entity is a shoe manufacturer, it may wish to offer a discount on its brand of shoes in addition to the cashback included in the first electronic content component). The second entity may then wish to publish an electronic content component that includes its own incentives as well as those offered by the first entity. In these and other cases, the content component manager 134 may receive a request from the second entity to publish a second electronic content component based on the first electronic content component and approve the request after the validation module 135 validates the first and second electronic content components. As with the first electronic content component, the system may create a second electronic content component in the content component data store 138 associated with a second set of traits and a third set of actions (e.g., additional incentives for the end-user), and add a second electronic content component block and the third set of actions to the blockchain.

The content component manager 134 may then receive a request from a third entity to use the second electronic content component. The content component manager 134 may create a second distribution agreement associating the third entity with the second electronic content component in the database. The second distribution agreement may be associated with a fourth set of actions (e.g., incentives for the third entity paid for by the second entity). Following the same procedure described above for the first distribution agreement, the content component manager 134 may add a second distribution agreement block to the blockchain based on the second distribution agreement, and add the fourth set of actions to the blockchain (e.g., as transactions or in a ledger). The content component manager 134 may then receive a request to publish custom content including the second electronic content component. After validating (via the validation module 135) that no immutable traits of the first or second electronic content components were modified, the content component manager 134 may approve the request to publish the custom content. The validation module 135 may also validate whether the first or second distribution agreements were modified and terminate any downstream distribution agreements as a result. For example, the system may determine the first distribution agreement was modified (by comparing the content hash of the distribution agreement stored in the content component data store with the content hash stored in the distribution agreement block in the blockchain), reject the request to publish the custom content, and terminate the second distribution agreement. If the content component manager 134 approves the request to publish the custom content, the event module 136 may receive a notification that an end-user has accessed the second electronic content component and in response to the notification, and execute the fourth, third, second, and first set actions (e.g., paying any commission due to the entities and applying any credits and/or discounts due to the end-user) as described above for the first set of actions.

Figure 4:
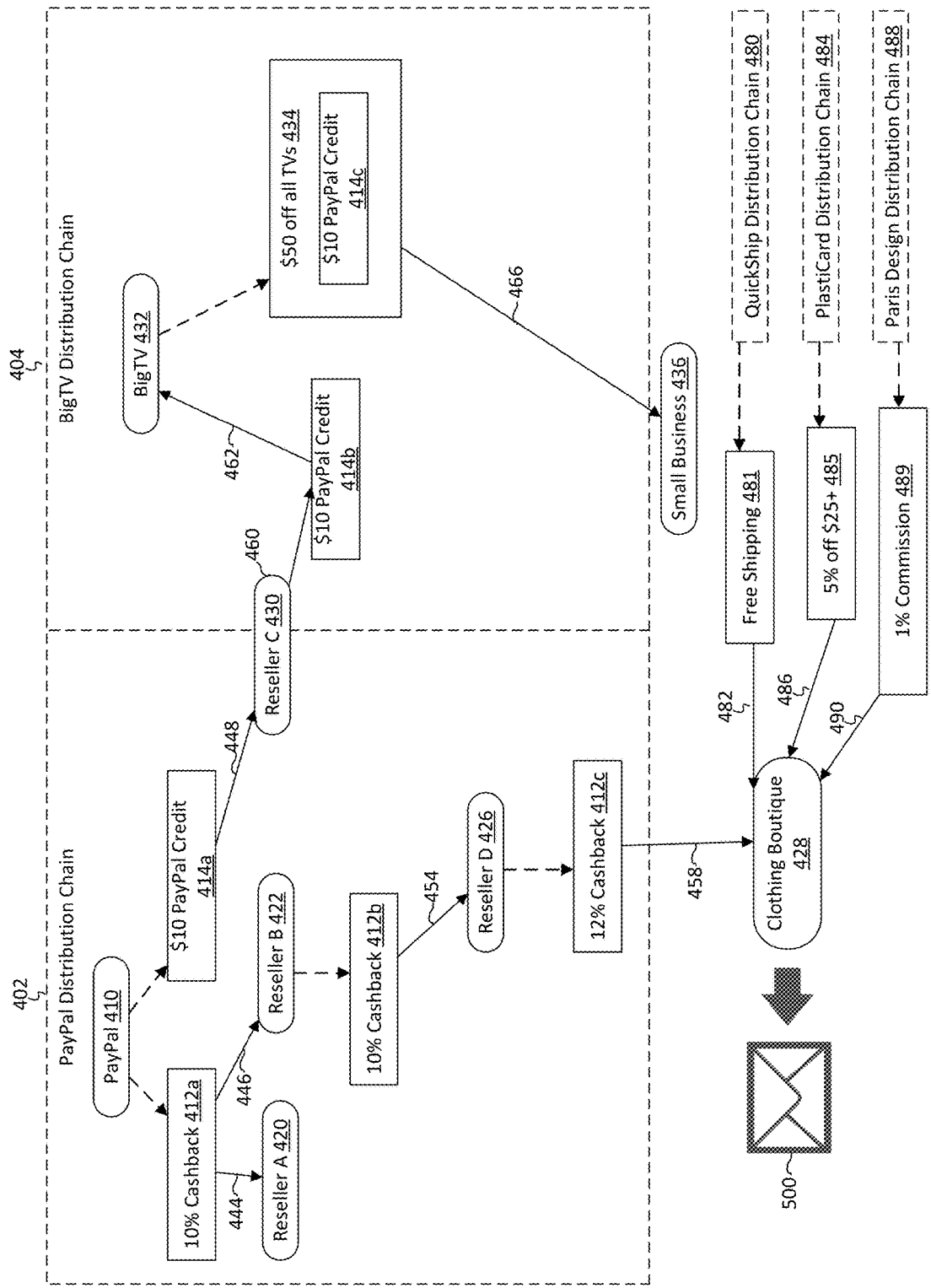
FIG. 4 illustrates various exemplary distribution chains for distributing redistributable electronic content components according to an embodiment of the present disclosure.

FIG. 4 illustrates various exemplary distributions chains 402, 404, 480, 484, and 488 for distributing redistributable electronic content components according to embodiments of the present disclosure. In the example of FIG. 4, entity 410 creates and publishes electronic content components 412a and 414a. For example, entity 410 may use a content component creation module 142 of a content creator server 140 to communicate with the content platform server 130 and create the electronic content components 412a and 414a. Electronic content components 412a and 414a may be visible to any entities in distribution chain 402, for example, entities 420, 422, 426 and 430.

Electronic content component 412a offers an end-user 10% cashback on a purchase (e.g., using a payment method provided by entity 410), and may provide an incentive for any entities distributing the electronic content components 412a in the distribution chain 402 (e.g., a commission based on a transaction amount, or a small payment whenever a user clicks on a link included in the electronic content component 412a). The cashback amount may be a mutable trait of electronic content component 412a. For example, entity 410 may have indicated that entities choosing to distribute electronic content component 412a may modify the amount of cashback offered, possibly within range (e.g., 10%-15%). Entity 420 may elect to distribute electronic content component 412a, prompting the creation of a distribution agreement 444 between entity 410 and entity 420. As illustrated, no entities have entered into a distribution agreement with entity 420 for further distribution of electronic content component 412a. Entity 422 has also elected to distribute electronic content component 412a, prompting the creation of distribution agreement 446. Entity 422 may publish electronic content component 412b for distribution, which may simply be a clone of electronic content component 412a. Entity 426 has elected to distribute electronic content component 412b, prompting the creation of distribution agreement 454 between entity 422 and entity 426. Before distributing electronic content component 412b, however, entity 426 modifies the amount of cashback offered from 10% to 12% and publishes electronic content component 412c based on electronic content component 412b. The validation module 235 may validate electronic content component 412c prior to publication, ensuring no immutable traits of electronic content components on which electronic content component 412c is based (i.e., electronic content components 412a and 412b) have been modified. As the cashback amount trait was defined as mutable, and the modified amount (12%) is within the allowable range (10%-15%), publication of electronic content component 412c succeeds. Entity 428, a merchant, elects to distribute electronic content component 412c as part of custom content. For example, entity 428 may use the message builder application 154 on the merchant server to compose and request publication of the custom content. Entity 428 may also wish to include electronic content components 481, 485, and 489 from distribution chains 480, 484, and 488, respectively. For example, electronic content component 481 from distribution chain 480 may offer users free shipping for using a shipping service offered by an entity controlling distribution chain 480. Electronic content component 485 from distribution chain 484 may provide a user with a discount when using a payment method offered by the entity controlling distribution chain 484. Electronic content component 489 from distribution chain 488 may not include any incentives for the user, but may include incentives for any entity that distributes the electronic content component 489 (e.g. 1% commission on sales of brand). After receiving requests from entity 428 to include electronic content components 481, 485, and 489 in custom content, the content component manager 134 may create distribution agreement 482 for electronic content component 481, distribution agreement 486 for electronic content component 485, and distribution agreement 490 for electronic content component 489. Entity 428 may then request to publish the custom content, resulting in validation by the validation module 135 of electronic content components 412c, 481, 485, and 489 (e.g., determining that no immutable properties have changed, entity 428 has permission to use the electronic content components 412c, 481, 485, and 489, and the publication date is within any allowable range indicated in electronic content components and their corresponding distribution agreements). Upon validation, entity 428 may compose and send message 500 (illustrated in detail in FIG. 5), including electronic content components 412c, 481, 485, and 489.

Entities may be included in more than one distribution chain (e.g., an account corresponding to the entity on account data store 138 may be associated with more than one distribution chain). For example, entity 430 is included in both distribution chain 402 and distribution chain 404, allowing entity 430 to distribute an electronic content component (e.g., 414a) from one distribution chain (e.g., 402) in a different distribution chain (e.g., 404). In some embodiments, an electronic content component may be created that incorporates a different electronic content component. For example, entity 430 may distribute electronic content component 414*a*, resulting in the creation of distribution agreement 448 and electronic content component 414*b*, which in this example is a clone of electronic content component 414*a*. Entity 432 may request to use electronic content component 414*b*, resulting in the creation of distribution agreement 462, but rather than merely redistributing electronic content component 414*b* (with the same or modified traits), entity 432 may create a new electronic content component 434 that includes electronic content component 414*b*, resulting in the creation of distribution agreement 462. Electronic content component 434 includes electronic content component 414*c* (cloned from electronic content component 414*b*) as a subcomponent. A merchant, e.g., entity 436, may request to publish custom content including electronic content component 434, resulting in the creation of distribution agreement 466 and validation of both electronic content component 434, electronic content component 414*c*, and all electronic content components preceding electronic content components 434 and 414*c* in distribution chains 404 and 402.

Figure 5:
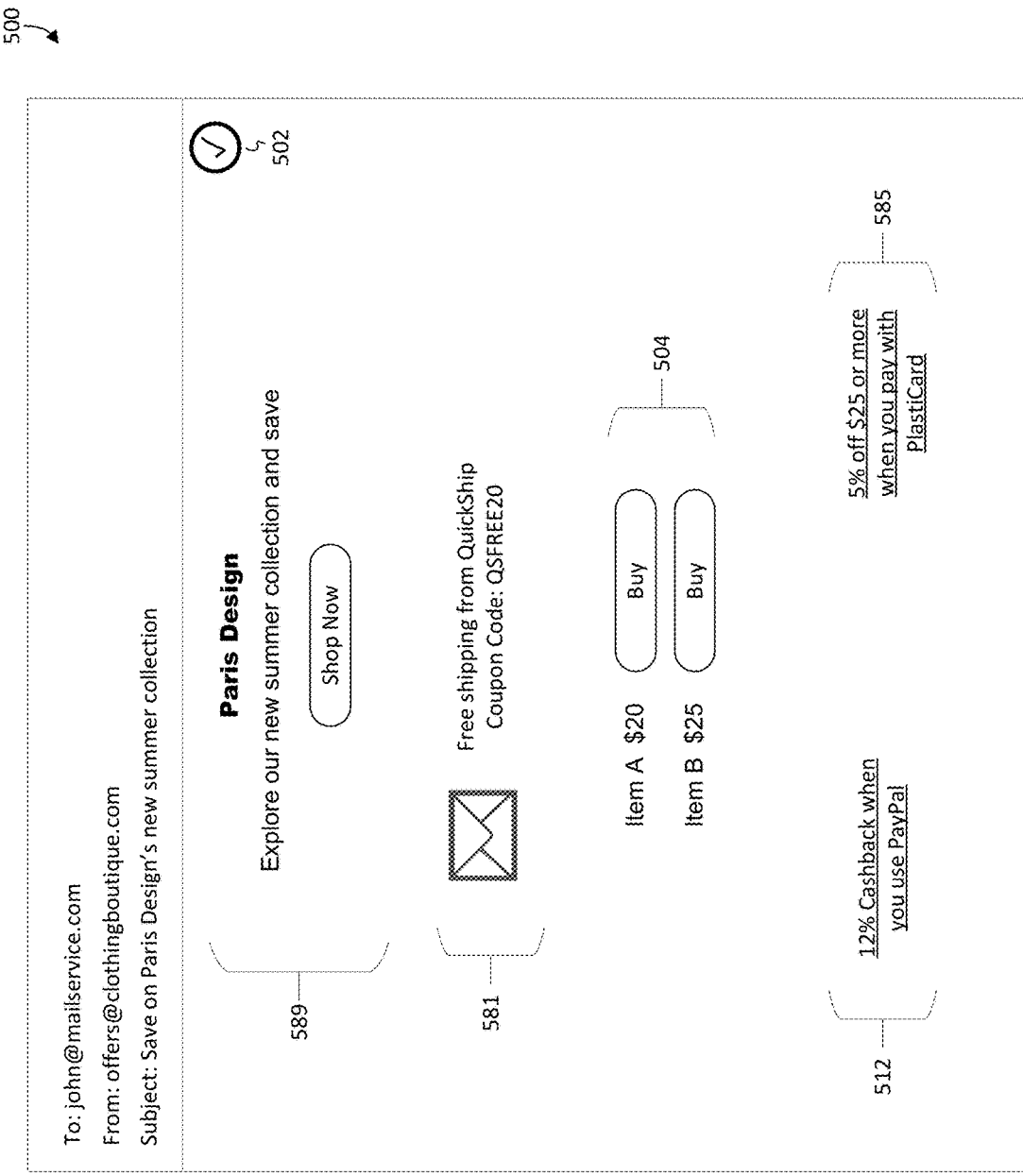
FIG. 5 illustrates a message including custom content that includes multiple redistributable electronic content components according to an embodiment of the present disclosure.

FIG. 5 illustrates a message 500 (e.g., an e-mail message) including custom content that includes multiple redistributable electronic content components according to an embodiment of the present disclosure. The message 500 illustrated in FIG. 5 corresponds to the message 500 in FIG. 4, created by entity 428 by incorporating electronic content components 412*c*, 481, 485, and 489, as described in FIG. 4. The arrangement and presentation of each electronic content component may be customized using a message builder application 154. Section 589 of message 500 incorporates electronic content component 489, section 581 incorporates electronic content component 481, section 512 incorporates electronic content component 412*c*, and section 585 incorporates electronic content component 485.

The message 500 includes a validation indicator 502 (e.g., represented in FIG. 5 as a checkmark, but which may also be a star, ribbon, or other icon, image, or text visible to the end-user) indicating that the electronic content components 412*c*, 481, 485, and 489 included in the message 500 have been validated. Clicking or tapping on the indicator may take the user to a web page hosted on the content platform server 130. The web page may include validation information for every each of the electronic content components 412*c*, 481, 485, and 489. For example, the web page may include a representation of the distribution chain, showing which entities each electronic content component originated from and the terms of each electronic content component.

Interactive UI elements (e.g., buttons and/or text) that function as hyperlinks may have their associated URLs decorated by the content component manager 134 during publication of the custom content to allow the electronic content component module 132 to track user engagement with each electronic content component. For example, the URL associated with the hyperlink in section 512 may be decorated with the query string "?eccID=827AJn0445k&daID=100354619& . . . " from which the electronic content component module 132 may determine that electronic content component 412*c* was clicked, as well as additional identifying information (e.g., a distribution agreement ID, the e-mail address of the user, the merchant that sent the message, etc.). In some embodiments, clicking on an interactive UI element may first take the user to a content platform server 130 (e.g., to an endpoint on the content platform server 130) before redirecting the user to their intended destination (e.g., a storefront hosted on merchant server 150). The merchant server 150 may be configured to transmit user event information (e.g., clicking on or hovering over items, making purchases, etc.) to the content platform server 130, to facilitate execution of the actions associated with the electronic content component 412*c*. For example, after clicking the link in section 512, the user may be taken to a storefront hosted the merchant server 150. When the user makes a purchase on the storefront, the merchant server 150 may send an event notification to the content platform server 130, which may cause the content platform server to execute all actions associated with the electronic content component 412*c*, parent electronic content components 412*b* and 412*a*, and distribution agreements 458, 454, and 446, as described in FIG. 2 and step 355 of FIG. 3. The message 500 may include content unrelated to an electronic content component. For example, section 504 links to purchase pages for two items, unassociated with an electronic content component.

Figure 6:
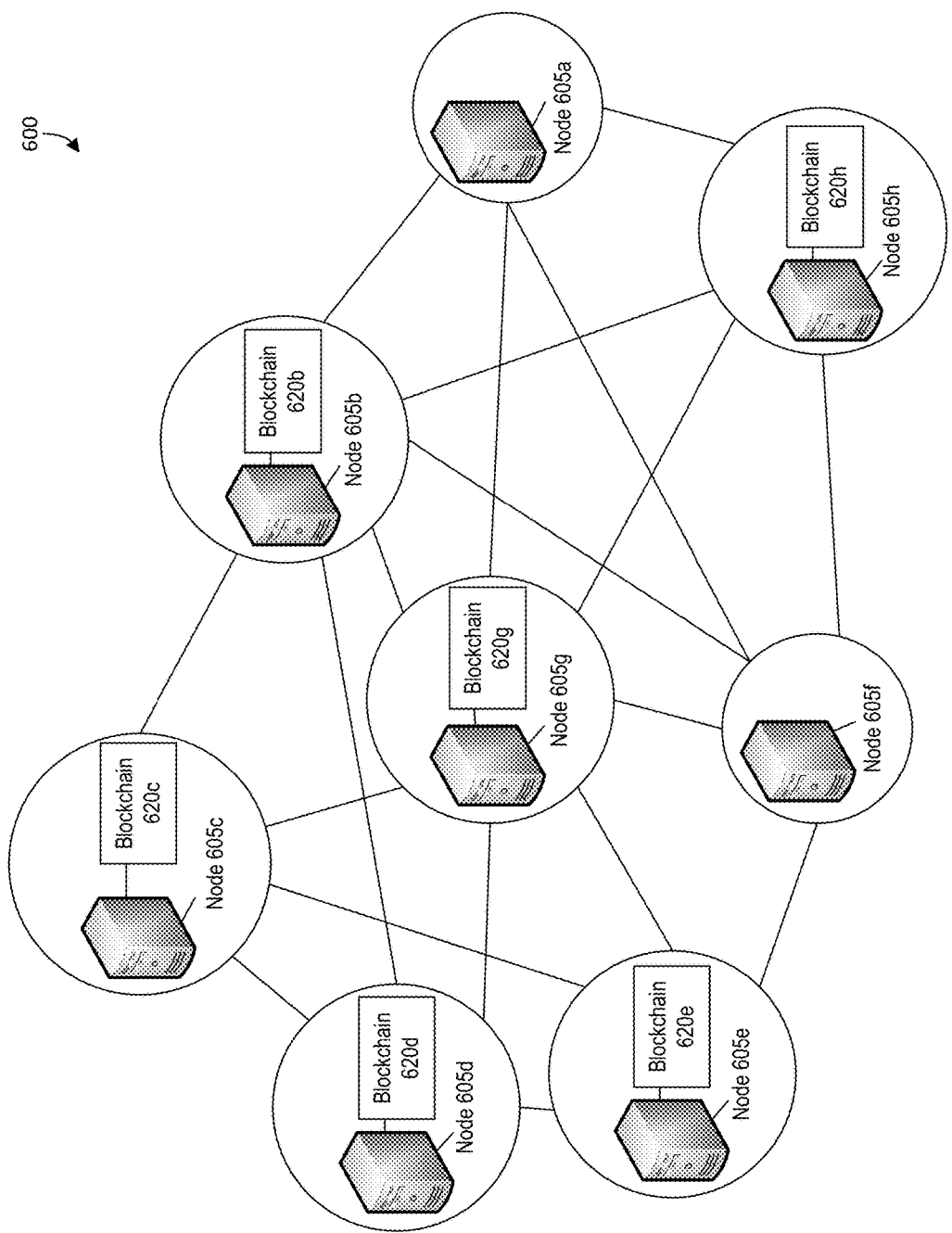
FIG. 6 illustrates an exemplary blockchain network.

FIG. 6 illustrates an exemplary blockchain network 600 comprising a plurality of interconnected nodes or devices 605*a-h* (generally referred to as nodes 605). Each of the nodes 605 may comprise a computer system 800 described in more detail with reference to FIG. 8. Content platform server 130, content creator servers 140*a* and 140*b*, and merchant server 150 may all be nodes 605 in the blockchain network 600. Although FIG. 6 shows a single device 605, each of the nodes 605 may comprise a plurality of devices (e.g., a pool). The blockchain network 600 may be associated with a blockchain 620, which may be the blockchain 180 described in detail in FIG. 2. Some or all of the nodes 605 may replicate and save an identical copy of the blockchain 620. For example, the nodes 605*b-e* and 605*g-h* store copies of the blockchain 620. The nodes 605*b-e* and 605*g-h* may independently update their respective copies of the blockchain 620 as discussed below.

Blockchain nodes, for example, the nodes 605, may be full nodes or lightweight nodes. Full nodes, such as the nodes 605*b-e* and 605*g-h*, may act as a server in the blockchain network 600 by storing a copy of the entire blockchain 620 and ensuring that transactions posted to the blockchain 620 are valid. The full nodes 605*b-e* and 605*g-h* may publish new blocks on the blockchain 620. Lightweight nodes, such as the nodes 605*a* and 605*f*, may have fewer computing resources than full nodes. The lightweight nodes may communicate with other nodes 605, provide the full nodes 605*b-e* and 605*g-h* with information, and query the status of a block of the blockchain 620 stored by the full nodes 605*b-e* and 605*g-h*. In this example, however, the lightweight nodes 605*a* and 605*f* may not store a copy of the blockchain 620 and thus, may not publish new blocks on the blockchain 620. In some embodiments, merchant server 150 may be a lightweight node.

The blockchain network 600 and its associated blockchain 620 may be public (permissionless), federated or consortium, or private. If the blockchain network 600 is public, then any entity may read and write to the associated blockchain 620. However, the blockchain network 600 and its associated blockchain 620 may be federated or consortium if controlled by a single entity or organization. Further, any of the nodes 605 with access to the Internet may be restricted from participating in the verification of transactions on the blockchain 620. The blockchain network 600 and its associated blockchain 620 may be private (permissioned) if access to the blockchain network 600 and the blockchain 620 is restricted to specific authorized entities, for example organizations or groups of individuals. Moreover, read permissions for the blockchain 620 may be public or restricted while write permissions may be restricted to a controlling or authorized entity.

Figure 7:
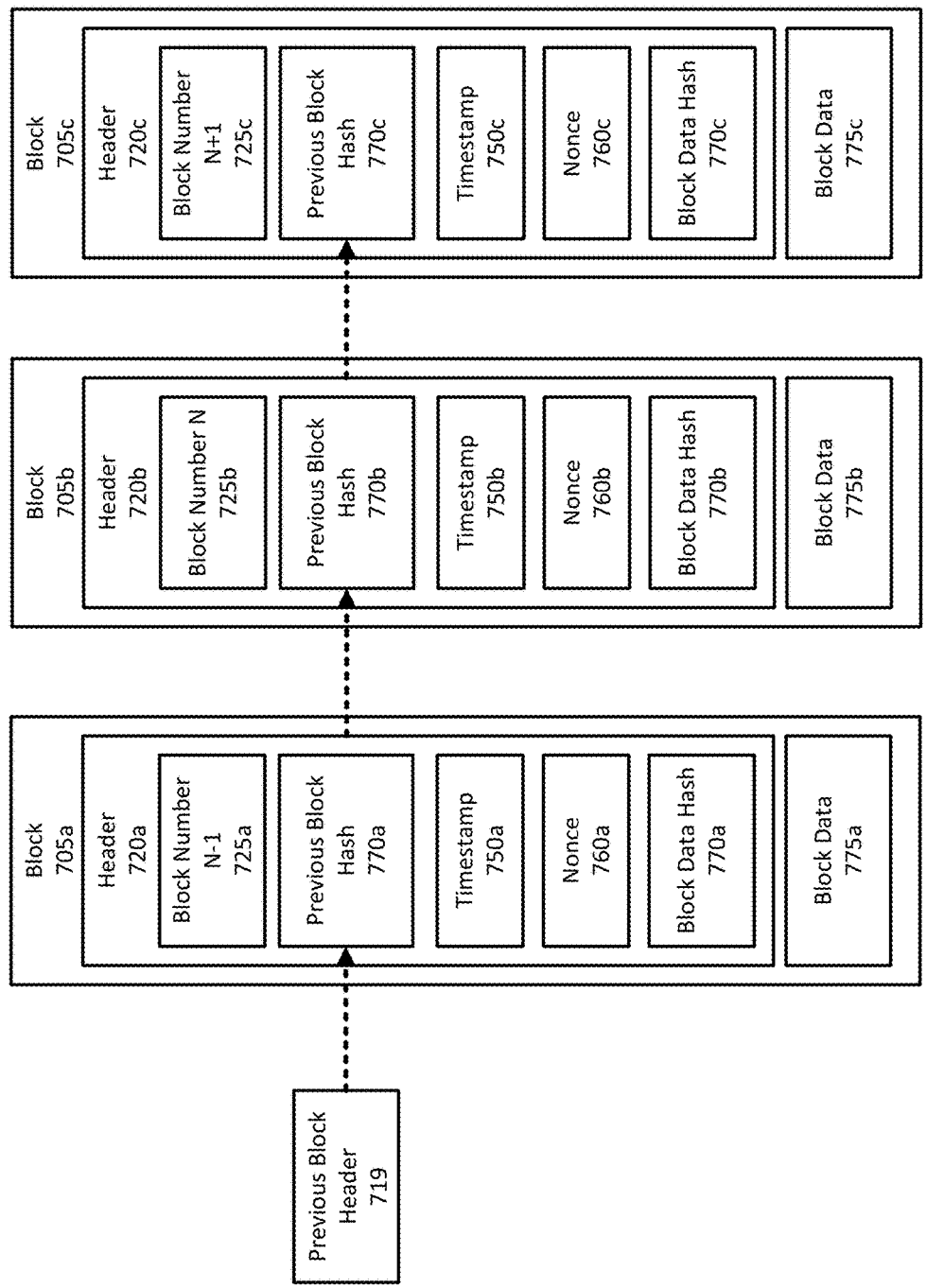
FIG. 7 illustrates an exemplary blockchain.

FIG. 7 illustrates an exemplary blockchain 700 suitable for implementing one or more aspects of the present disclosure, for example, the blockchain 180. The blockchain 700 may comprise a plurality of blocks 705a, 705b, and 705c (generally referred to as blocks 705). The blockchain 700 comprises a first block (not shown), sometimes referred to as the genesis block. Each of the blocks 705 may comprise a record of one or a plurality of submitted and validated transactions. The blocks 705 of the blockchain 700 may be linked together and cryptographically secured. Examples of the various types of data fields stored in a blockchain block are provided below. A copy of the blockchain 700 may be stored locally, in the cloud, on grid, for example by the nodes 605b-e and 605g-h, as a file or in a database.

Each of the blocks 705 may comprise one or more data fields. The organization of the blocks 705 within the blockchain 700 and the corresponding data fields may be implementation specific. As an example, the blocks 705 may comprise a respective header 720a, 720b, and 720c (generally referred to as headers 720) and block data 775a, 775b, and 775c (generally referred to as block data 775). The headers 720 may comprise metadata associated with their respective blocks 705. For example, the headers 720 may comprise a respective block number 725a, 725b, and 725c. As shown in FIG. 7, the block number 725a of the block 705a is N−1, the block number 725b of the block 705b is N, and the block number 725c of the block 705c is N+1. The headers 720 of the blocks 705 may include a data field comprising a block size (not shown).

The blocks 705 may be linked together and cryptographically secured. For example, the header 720b of the block N (block 705b) includes a data field (previous block hash 770b) comprising a hash representation of the previous block N−1's header 720a. The hashing algorithm utilized for generating the hash representation may be, for example, SHA-256 which results in an output of a fixed length. In this example, the hashing algorithm is a one-way hash function, where it is computationally difficult to determine the input to the hash function based on the output of the hash function. Additionally, the header 720c of the block N+1 (block 705c) includes a data field (previous block hash 770c) comprising a hash representation of block N's (block 705b) header 720b.

The headers 720 of the blocks 705 may also include data fields comprising a hash representation of the block data, such as the block data hash 770a-c. The block data hash 770a-c may be generated, for example, by a Merkle tree and by storing the hash or by using a hash that is based on all of the block data. The headers 720 of the blocks 705 may comprise a respective nonce 760a, 760b, and 760c. In some implementations, the value of the nonce 760a-c is an arbitrary string that is concatenated with (or appended to) the hash of the block. The headers 720 may comprise other data, such as a difficulty target.

The blocks 705 may comprise a respective block data 775a, 775b, and 775c (generally referred to as block data 775). The block data 775 may comprise a record of validated transactions that have also been integrated into the blockchain. As discussed above, the block data 775 may include a variety of different types of data in addition to validated transactions. Block data 775 may include any data, such as text, audio, video, image, or file, that may be represented digitally and stored electronically.

Figure 8:
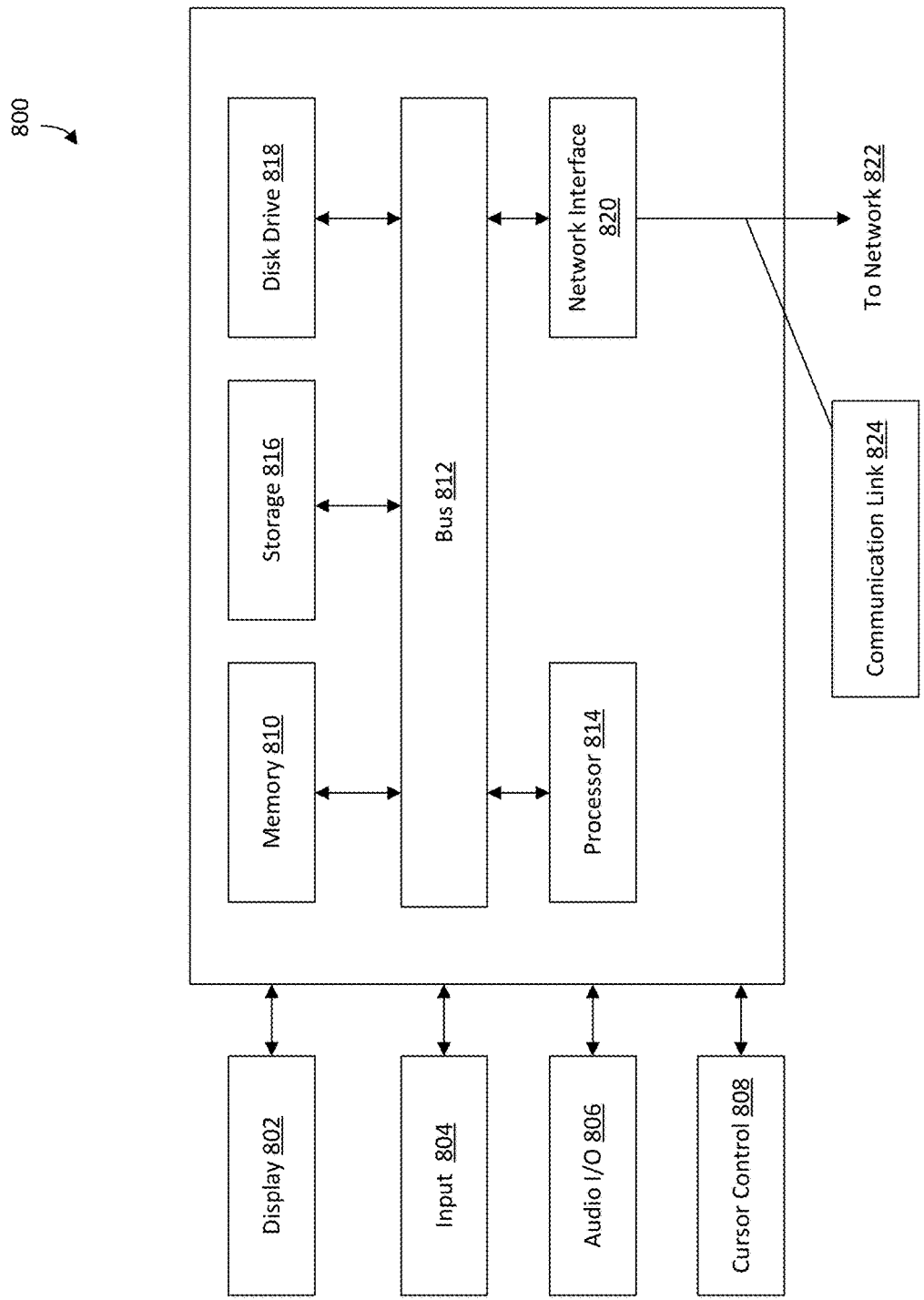
FIG. 8 is a block diagram of a system for implementing a device according to an embodiment of the present disclosure.

FIG. 8 is a block diagram of a computer system 800 suitable for implementing one or more aspects of the present disclosure, including the content platform server 130 and the user device 110. In various implementations, the user device 110 may include a mobile cellular phone, personal computer (PC), laptop, wearable computing device, etc. adapted for wireless communication, and the content platform server 130 may include a network computing device, such as a server. Thus, it should be appreciated that the devices 110 and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a content platform server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the functions described herein according to process 300.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   creating, in a database, a first electronic content component associated with a first entity, the first electronic content component including a first set of one or more traits, each trait being either mutable or immutable by consumers of the first electronic content component, wherein the first electronic content component is further associated a first set of one or more actions;
   publishing the first electronic content component including storing each action of the first set of one or more actions in a blockchain and adding, to the blockchain, a first electronic content component block based on the first electronic content component;
   receiving, from a second entity, a request to use the first electronic content component;
   creating, based on the request, a distribution agreement having a plurality of terms in the database, the distribution agreement associating the second entity with the first electronic content component, and the distribution agreement being associated with a second set of one or more actions, wherein a first subset of the plurality of terms correspond to the traits that are immutable traits, wherein a second subset of the plurality of terms correspond to the traits that are mutable;
   adding, to the blockchain, each action of the second set of one or more actions;
   adding, to the blockchain, a distribution agreement block based on the distribution agreement;
   receiving, from the second entity, a request to publish custom content including the first electronic content component;
   validating that the first electronic content component matches the first subset of the plurality of terms with respect to the received request to publish the custom content;
   receiving a notification that an end-user has accessed the first electronic content component; and
   executing, based on the receiving of the notification, the second set of one or more actions and the first set of one or more actions.

2. The system of claim 1, wherein storing each action of the first set of one or more actions in the blockchain includes storing each action in a transaction on the blockchain.

3. The system of claim 1, wherein the first set of one or more actions includes at least one of applying a credit to an account associated with the end-user or applying a discount to a purchase associated with the first electronic content component.

4. The system of claim 1, wherein the adding of the first electronic content component block to the blockchain comprises:
   storing, in the first electronic content component block, a first content hash based at least on each immutable trait of the first set of one or more traits; and
   storing, in the first electronic content component block, one or more addresses, each address associated with an action of the first set of one or more actions.

5. The system of claim 4, wherein validating the first electronic content component comprises:
   determining, based on the first content hash, that no immutable traits of the first set of one or more traits have been modified in the custom content.

6. The system of claim 1, wherein each trait of the first set of one or more traits is associated with a finalization scope indicating (i) the trait is to be made immutable when the distribution agreement is created or (ii) the trait is to be made immutable when the custom content is published.

7. The system of claim 6, wherein creating the distribution agreement in the database comprises:

creating, based on the first electronic content component, a child electronic content component including a child set of one or more traits, each trait of the child set of one or more traits being a copy of a trait of the first set of one or more traits;

setting a parent field of the child electronic content component to reference the first electronic content component; and setting as immutable each trait of the child set of one or more traits that is associated with a finalization scope indicating the trait is to be finalized when the distribution agreement is created, and adding the distribution agreement block in the blockchain comprises:

creating the distribution agreement block;

storing, in the distribution agreement block, a second content hash based at least on each immutable trait of the child set of one or more traits; and storing, in the distribution agreement block, one or more addresses, each address corresponding to an action of the second set of one or more actions.

8. The system of claim 1, wherein each action of the first set of one or more actions and each action of the second set of one or more actions is represented by a smart contract.

9. The system of claim 1, wherein the distribution agreement is associated with a time frame indicating when the distribution agreement is valid, and the operations further comprise:

receiving a second notification that a second end-user has accessed the first electronic content component at an access time;

determining the access time is outside the time frame indicating when the distribution agreement is valid; and determining not to execute the second set of one or more actions or the first set of one or more actions in response to the determining the access time is outside the time frame.

10. A method, comprising:

receiving, from a first entity, a request to use a first electronic content component associated with a second entity, wherein the first electronic content component includes one or more mutable traits and one or more immutable traits, and wherein the first electronic content component is further associated a first set of one or more actions, the request including a request to modify a first trait of the one or more traits;

accessing the first electronic content component from a database, wherein the first electronic content component was published, causing each action of the first set of one or more actions to be stored in a blockchain and a first electronic content component block to be added to the blockchain based on the first electronic content component;

approving the request to use the first electronic content component;

creating, after the request to use the first electronic content component has been approved, a distribution agreement associating the first entity with the first electronic content component in the database, the distribution agreement being associated with a second set of one or more actions, wherein the distribution agreement includes a first set of terms corresponding to one or more immutable traits and a second set of terms corresponding to the one or more mutable traits;

adding, to the blockchain, each action of the second set of one or more actions;

adding, to the blockchain, a distribution agreement block based on the distribution agreement;

receiving, from the first entity, a request to publish custom content including the first electronic content component;

determining whether the first electronic content component in the custom content deviates from the first set of terms of the distribution agreement; and approving or rejecting the request to publish the custom content based on the determining;

wherein at least one of the receiving the request to use the first electronic content component, the accessing the first electronic content component, the approving the request, the creating the distribution agreement, the adding the each action, the adding the distribution agreement, the receiving the request to publish custom content, the determining, or the approving or rejecting is performed by one or more hardware processors.

11. The method of claim 10, wherein approving the request to use electronic content component comprises:

determining the first trait is mutable; and approving the request to modify the first trait.

12. The method of claim 11, wherein the first trait is associated with a range within which a value of the first trait may be modified, and approving the request to modify the first trait includes determining a modified value of the first trait is within the range.

13. The method of claim 10, further comprising:

wherein the determining comprises determining, based on a content hash associated with the first electronic content component block, that a first immutable trait of the one or more immutable traits was modified; and wherein the approving or rejecting the request comprises rejecting the request to publish the custom content.

14. The method of claim 10, further comprising:

wherein the determining comprises determining, based on a hash associated with the first electronic content component block, that none of the one or more immutable traits was modified; and wherein the approving or rejecting the request comprises approving the request to publish the custom content.

15. The method of claim 10, wherein the first electronic content component is associated with a uniform resource locator (URL), and wherein the method further comprises:

adding tracking information to the URL in response to the receiving of the request to publish the custom content.

16. A non-transitory machine-readable medium having stored thereon machine-readable instructions executable to cause a machine to perform operations comprising:

creating, in a database, a first electronic content component associated with a first entity, the first electronic content component including a set of one or more traits, each trait being either mutable or immutable, wherein the first electronic content component is further associated a first set of one or more actions;

publishing the first electronic content component, wherein the publishing includes storing each action of the first set of one or more actions in a blockchain and adding, to the blockchain, a first electronic content component block based on the first electronic content component;

receiving, from a second entity, a request to use the first electronic content component;

creating, in response to the request, a first distribution agreement associating the second entity with the first electronic content component in the database, the first distribution agreement being associated with a second set of one or more actions, wherein the first distribution agreement includes a first set of terms associated with the traits that are immutable and a second set of terms associated with the traits that are mutable;

adding, to the blockchain, each action of the second set of one or more actions;

adding, to the blockchain, a first distribution agreement block based on the first distribution agreement;

receiving, from the second entity, a request to create a second electronic content component based on the first electronic content component;

creating, in the database, the second electronic content component associated with the second entity, the second electronic content component including a second set of one or more traits, each trait being either mutable or immutable by consumers of the second electronic content component, wherein the second electronic content component is further associated with a third set of one or more actions; and approving, based on a verification that the second electronic content component is consistent with the first set of terms, the request to publish the second electronic content component.

17. The non-transitory machine-readable medium of claim 16, the operations further comprising:

receiving, from a third entity, a request to use the second electronic content component;

creating, in response to the request, a second distribution agreement associating the third entity with the second electronic content component in the database, the second distribution agreement being associated with a fourth set of one or more actions;

adding, to the blockchain, each action of the fourth set of one or more actions;

adding, to the blockchain, a second distribution agreement block based on the second distribution agreement; and receiving, from the third entity, a request to publish custom content including the second electronic content component.

18. The non-transitory machine-readable medium of claim 17, the operations further comprising:

approving the request to publish the custom content;

receiving a notification that an end-user has accessed the second electronic content component; and executing, in response to the receiving of the notification, the fourth set of one or more actions, the third set of one or more actions, the second set of one or more actions, and the first set of one or more actions.

19. The non-transitory machine-readable medium of claim 17, the operations further comprising:

determining, based on the second distribution agreement block, that an immutable trait of the set second of one or more traits was modified; and rejecting, based on the determining that an immutable trait of the second set of one or more traits was modified, the request to publish the custom content.

20. The non-transitory machine-readable medium of claim 17, the operations further comprising:

determining, based on the first distribution agreement block, the first distribution agreement was modified; and terminating, based on the determining the first distribution agreement was modified, the second distribution agreement.

\* \* \* \* \*